United States Patent [19]

Raabe

[11] 3,757,334

[45] Sept. 4, 1973

[54] STABILIZED COMMUNICATION AND CONTROL SYSTEM

[75] Inventor: Herbert P. Raabe, Chappaqua, N.Y.

[73] Assignee: International Business Machines Corporation, Armonk, N.Y.

[22] Filed: Feb. 29, 1968

[21] Appl. No.: 710,712

[52] U.S. Cl. .................. 343/100 TD, 325/4, 325/67, 343/100 CS

[51] Int. Cl. .................. G01s 3/42

[58] Field of Search .................. 343/100.6, 100.6 R, 343/7.5, 6.5; 325/4

[56] References Cited

UNITED STATES PATENTS

| | | | |
|---|---|---|---|
| 2,467,299 | 4/1949 | Espenschied | 343/6.5 |
| 3,174,150 | 3/1965 | Sferrazza et al. | 343/117 A X |
| 3,196,438 | 7/1965 | Kompfner | 343/100.6 R |
| 3,273,151 | 9/1966 | Cutler et al. | 343/100.6 R |
| 3,314,067 | 4/1967 | Rutz | 343/100.6 R |

*Primary Examiner*—Benjamin A. Borchelt
*Assistant Examiner*—Richard E. Berger
*Attorney*—Hanifin and Jancin and Bernard N. Wiener

[57] ABSTRACT

The disclosure provides a stabilized retrodirective oscillating loop or link for a channel of a communication and control system incorporating a pair of remotely located retrodirective antenna array terminals wherein the mechanical and electrical design parameters of the terminals and the circuits thereat contribute to frequency stabilization of the loop. Translational and rotational motions of the retrodirective terminals introduce frequency shifts into the communication channel between the pair of remotely located terminals. Doppler frequency shifts and local oscillator shifts are compensated by the electronic circuitry which stabilizes the retrodirective oscillating loop of the communication and control channel through voltage control of at least one local oscillator in each oscillating loop. The design of the retrodirective terminal separates the receive and transmit antenna elements from each other by placing them on separate spatial surfaces with identical geometrical shapes. Preferably, the two geometrical shapes are scaled in size in a ratio as the oscillation wavelengths being received and transmitted. The surfaces are rigidly interconnected by a communicating tubular member. The system permits high amplification and independent signal modulation in both directions between the antenna arrays at the remotely located terminals of the loop.

17 Claims, 7 Drawing Figures

PATENTED SEP 4 1973 3,757,334

SHEET 1 OF 2

INVENTOR
HERBERT P. RAABE

BY Bernard N. Wiener
ATTORNEY

STABILIZED COMMUNICATION AND CONTROL SYSTEM

BACKGROUND OF THE INVENTION

This invention relates generally to retrodirective oscillating loops for communication and control channels between pairs of remotely located retrodirective antenna array terminals, and it relates more particularly to such a loop which incorporates mechanical and electrical design for stabilizing the carrier frequency oscillation of the loop.

In copending patent application Ser. No. 710,711 by E. L. Gruenberg, filed on even date herewith and assigned to the assignee hereof, a retrodirective oscillating loop for a communication and control channel is described for the transmission and reception of energy waveforms between remotely located terminals wherein each terminal has a retrodirective property with respect to the waveform propagation in the channel. It has been demonstrated therein that two retrodirective communications repeaters or terminals form a retrodirective oscillating loop if the signal transmitted by one terminal is received, amplified, and transmitted back by the second terminal and again received, amplified, and transmitted by the first terminal while remaining stationary in time. Illustratively, when a retrodirective oscillating loop is established between two remotely located antenna array terminals of an electromagnetic radiation spectrum communication and control channel, a carrier oscillation is initiated from the noise spectrum present in the apertures of each array when the input aperture of each terminal is within the field of view of the output aperture of the other terminal.

The noted copending patent application Ser. No. 710,711 by E. L. Gruenberg will now be described in greater detail. A carrier waveform for the retrodirective oscillating loop builds up between two remotely located antenna array terminals with retrodirective properties when sufficient amplification is provided in the loop to overcome losses which occur at the terminals and in the medium between them. Each of the retrodirective antenna array terminals of a retrodirective oscillating loop has the property of automatically steering toward each other when each terminal is within the field of view of the other terminal. A retrodirective antenna develops antenna gain when each multiple radiating antenna element receives or transmits the carrier waveform, except for a time or phase shift which is a function of the location of the radiating element within the antenna array. The gain of a retrodirective antenna is not available for the first half-cycle of the mode build-up in a retrodirective oscillating loop, since the waveforms of the initiating noise of the array elements are independent. In contrast, the system gain is immediately established in a conventional directive antenna.

Of background interest for understanding the contribution of the present invention are the following aspects of the prior art: U. S. Pat No. 2,467,299 by L. Espenschied, which presents a high frequency transmission system wherein two remotely located terminals are caused to communicate with each other in a singing loop through a predetermined path between the terminals whose relative locations and respective orientations must be predetermined; U. S. Pat. No. 2,908,002 by L. C. Van Atta, for an electromagnetic reflector, which presents an antenna structure for electromagnetic radiation which provides a returned waveform with predetermined direction and phase relative to a related incident waveform; U. S. Pat. No. 3,196,438 by R. Kompfner for an antenna system which presents an improved Van Atta array having antenna elements arranged in a circular or spherical configuration; U. S. Pat. No. 3,150,320 by E. L. Gruenberg for a space satellite communications system employing a modulator reflector relay means which incorporates an antenna array of the Van Atta type with modulation means inserted in each connecting transmission path between conjugate or symmetrical antennas; and U. S. Pat. No. 3,314,067 shows that array elements can be placed in the same location on the convex side of an antenna sphere if the phase of the received signal is inverted by a frequency transformation process using a local oscillator with a frequency close to the signal frequency.

In the original Van Atta array described in the noted U. S. Pat. No. 2,908,002 by L. C. Van Atta, the array elements are located within a plane. Such an array is effective only over a limited angular range. If the repeater is free to rotate, multiple arrays must be arranged to maintain uninterrupted oscillation in a retrodirective oscillating loop, e.g., on the faces of a cube. However, the handover of the transmission from one array to the other does not occur without severe interference effects because there are phase changes in the two transmissions in opposite senses so that there are partial and nearly complete cancellations of the retrodirective transmission, causing complete interruption of the oscillation of a retrodirective oscillating loop.

It is shown in the noted U. S. Pat. No. 3,196,438 by R. Kompfner, that antenna elements can be placed on the surface of a sphere and interconnected over amplifiers so that the retrodirectivity is maintained smoothly for an attitude. In the Kompfner antenna the receiving and transmitting elements must be located on opposite sides of the sphere. If the receiving elements are located on the convex or outer side of the sphere, the coordinated transmitting elements must be located on the concave or inner side of the sphere necessitating transmission through the sphere past the receiving elements. Even if the transmitting and receiving elements were placed on two different spheres, the transmission must pass the back side of the transmitting elements. The noted retrodirective spherical array of U. S. Pat. No. 3,314,067 may not be especially suitable for use in a retrodirective oscillating loop circuit, since the retrodirective radiation does not develop the full array gain. Phase inversion is accompanied by a change of the wavelength; and complete compensation of the delays between the receiving elements is difficult to achieve and results in a curved outgoing wavefront. This retrodirective antenna array appears to be best suited for an open loop configuration in which an unmodulated carrier is generated at the directive terminal and modulated at the retrodirective terminal.

The following is an explanation based on theoretical considerations of the physical mechanism by which a retrodirective oscillating loop is built up from noise.

When the retrodirective oscillating loop is first turned on, there is a noise output from each antenna element because of noise received by the associative receiving element and from the noise locally generated in each amplifier. Each of these noise outputs is considered to be independent of every other noise output.

Therefore, the resultant noise output of each antenna array terminal of the loop is radiated throughout its entire field of view. Part of the noise output is received by the other array of the loop at a much lower power level than the power level of the locally generated noise. Since the received noise may be considered as originating from a point source, it is coherent across the receiving antenna aperture. The noise received from the other antenna array terminal of the retrodirective oscillating loop is returned in the direction from which it was received with the full gain of the antenna array because of the linearity of the system at low power levels. This mechanism continues until a carrier frequency is built up in the oscillating loop including the terminals A and B.

In greater detail, the theoretical omnidirectional noise radiation of an antenna array of point noise sources consists initially of a large number of lobes. The noise components of every retrodirective array element contributes to a coherent radiation in the direction of the lobe. The width of the retrodirective beam from the retrodirective antenna array is the width of the lobe. The number of lobes equals the gain factor of the array. One retrodirective antenna array terminal of the retrodirective loop receives noise radiation during the initial half-cycle of mode build-up equivalent to the noise radiation from a single-feed antenna of the same gain as the other retrodirective antenna array terminal. Because the receiver terminal operates linearly, the received noise waveform thereat is reradiated retrodirectively at the full receiver terminal amplifier and antenna array gain independent of the noise level generated within the receiver terminal. Therefore, the full gain build-up of the retrodirective oscillating loop starts from a noise level which is below the intially radiated noise by the factor of the antenna array gain. The mode build-up time of the loop is proportional to the number of array elements which in turn is approximately equal to the array gain.

It is desirable that a retrodirective oscillating loop be stable when the two retrodirective terminals operate over a variable relative distance. Illustratively, when the repeaters approach each other, the signal is received with an upward Doppler shift, and another Doppler increase takes place as the original frequency is transmitted back to the first repeater. The frequency of the carrier oscillation may continue to increase until the system may no longer be capable of transmitting and amplifying the signal.

It is also desirable for a modulated signal to be transmitted from one terminal to the other of a retrodirective oscillating loop.

OBJECTS OF THE INVENTION

It is an object of this invention to provide a retrodirective oscillating loop for a communication and control channel and terminals therefor in which mechanical and electrical design parameters are incorporated for compensating Doppler shift and local oscillator drifts in carrier frequencies.

It is another object of this invention to provide a retrodirective antenna array terminal suitable for use in a retrodirective oscillating loop which has matched geometrically shaped surfaces upon which are disposed reciprocal antenna array elements in substantially matched relationship relative to the wavefront of the received and transmitted radiation, and scaled dimensionally in accordance with the wavelengths of the radiations.

It is another object of this invention to provide a retrodirective antenna array terminal suitable for use in a retrodirective oscillating loop wherein the receive antenna elements are disposed on one spherical surface, and the transmit antenna elements are disposed on another spherical surface, the surfaces being rigidly established relative to each other.

It is another object of this invention to provide a retrodirective antenna array terminal suitable for use in a retrodirective oscillating loop wherein the receive antenna elements are disposed on one cylindrical surface, and the transmit antenna elements are disposed on another cylindrical surface, the surfaces being rigidly established relative to each other.

The foregoing and other objects, features, and advantages of the invention will be apparent from the following more particular description of a preferred embodiment of the invention, as illustrated in the accompanying drawings.

SUMMARY OF THE INVENTION

Figure 1A:
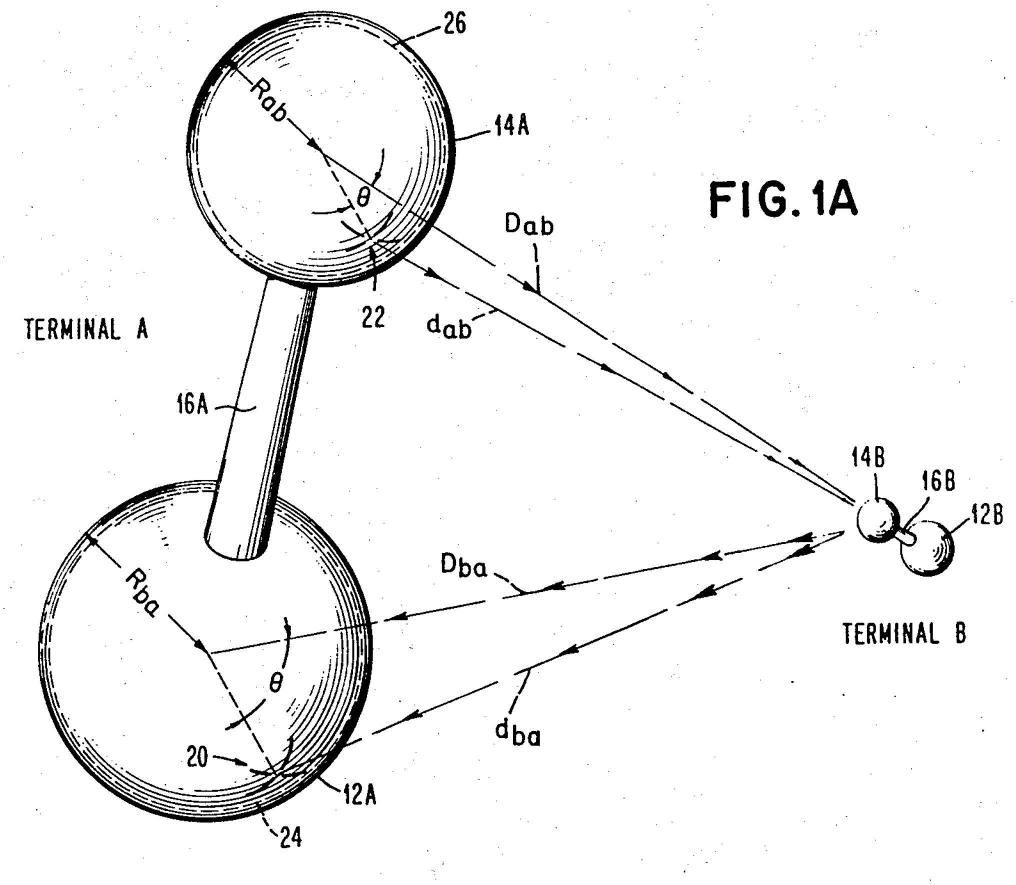
FIG. 1A is a perspective drawing of two retrodirective antenna array terminals illustrating matched geometric surfaces with scaled dimensions related to the wavelengths of carrier oscillations involved which support antenna elements in reciprocal relationship to the retrodirective wavefront which provides isolation of received radiation from transmitted radiations.

This invention provides a retrodirective oscillating loop incorporating two remotely located retrodirective antenna array terminals for a communication and control channel which can sustain a stabilized oscillation mode under any motion of rotation and translation of the antenna arrays. The loop enables high amplification and independent signal modulation in both directions between the retrodirective terminals. The gain of the retrodirective antenna arrays is not lost when the carrier frequencies are separated for transmission in the two directions between the terminals. Each retrodirective antenna array has special mechanical and electrical design parameters and circuitry at the terminals for compensating the Doppler shifts in carrier frequencies due to relative motion between them as well as shifts due to local oscillator drifts.

All the receive antenna elements of an array are distributed on one geometrical surface, and all the transmit elements are similarly distributed on another geometrical surface in respective locations which are in reciprocal relation relative to the retrodirective wavefront. The geometrical surfaces are scaled dimensionally in accordance with the wavelengths of the oscillations received or transmitted therefrom.

The circuitry achieves Doppler compensation by frequency stabilization through frequency offsetting, and the scaling of the volumes of receive and transmit geometrical surfaces at each array preclude phase distortion between the received and transmitted beams. The geometrical surfaces are rigidly interconnected in spatial orientation relative to each other. The mechanical member which rigidly interconnects the geometrical surfaces may conveniently be utilized for housing electronic components. Exemplary geometrical surfaces suitable for the geometrical surfaces of the retrodirective antenna array are spherical, cylindrical, and polyhedral.

Retrodirective oscillating loop circuits develop maximum loop gain if the carrier waveform experiences a waveshift of an integer number of cycles on a round trip around the loop. The circuitry should desirably not restrict the self-adjustability of optimum carrier frequency conditions or modes. However, circuits containing local oscillators for certain operational advantages impose constraints on the modes. The following are constraints imposed upon a retrodirective oscillating loop when local oscillators are included in loop circuitry which are presented in copending application Ser. No. 710,711 "Communication and Control System" by E. L. Gruenberg, filed herewith and assigned to the assignee hereof:

a. An offset frequency oscillator included in each terminal causes the transmitted and received frequencies to differ and isolates the reception from the transmission at the same terminal.

b. A local oscillator at each terminal converts the carrier frequency to an intermediate frequency to achieve the required electronic gain and effective frequency filtering at the terminal.

c. Two amplifier circuits operating in different frequency channels and local oscillators for frequency conversion are included at each terminal of a retrodiredtive oscillating loop to increase the overall antenna gain and to permit use of each antenna element at each terminal for both reception and transmission.

Local oscillators included in the retrodirective oscillating loop circuitry in accordance with the present invention shift the frequency of the transmission in one direction into the negative spectrum with respect to the frequency of the reception in the other direction so that Doppler frequency shifts are mainly compensated, and insensitivity is achieved to changes in the distance between the terminals. Since the Doppler frequency shifts are not completely compensated by the shift of the frequency of transmission onto the negative spectrum, i.e., inversion, a frequency stabilization circuit is included to compensate for local oscillator drifts as well as Doppler frequency shifts.

A retrodirective oscillating loop provided by this invention incorporates control circuits for a stable mode of operation to be sustained. For the operational circumstance of the terminals being stationary, the local oscillators at each remotely located retrodirective terminal must be synchronized with each other so that the phase that is added twice to the received carrier at one terminal is subtracted twice the full amount at the other terminal. A phase difference of many cycles rapidly develops even though highly stable oscillators are incorporated in the retrodirective oscillating loop unless they are synchronized. An upward or downward shift of the mode frequency by one round trip frequency results from the addition or removal of one cycle. Illustratively, the oscillation decays if there is a shift of the mode frequency to the upper or lower edge of the amplifier pass band where required loop gain is not available. The loop gain in the center of the amplifier pass band increases as the mode decays, and the nearest mode then builds up to the limiting level and in sequence shifts to the edge of the pass band and decays. Consequently, in the absence of control circuits there is a mode switching which limits usefulness of the carrier oscillation for transmission of modulated signals.

PRINCIPLES OF THE INVENTION

If the terminals of a retrodirective oscillating loop are in relative separating linear motion at constant speed, study of the equivalent mode frequency reveals the nature of the change of carrier frequencies. The oscillating mode maintains the number of mode cycles in the expanding loop as the mode frequency is received at a downward shift due to Doppler effect in the transmitted frequency. The mode frequency $f_m$ is related to the distance d between the terminals according to the expression $$f_m = (mc/2d)$$

where $m$ = integer and $c$ is the velocity of light. It can be shown theoretically that the mode frequency coincides with the intermediate frequency which is carried over the propagation paths by a single side band modulated radiofrequency carrier having frequency $$(|f_{ab}| + |f_{ba}|)/2.$$

By utilizing one side band in one direction and the other side band in the opposite direction, the phase effects on the radiofrequency carrier cancel.

By substituting $f_i$ for $f_m$ and $vt$ for d in the expression $f_m = (mc/2d)$ where $v$ is the relative velocity of the separating terminals, there results $f_i = (mc/2vt)$. To stabilize the intermediate frequency $f_i$, there must be an increase of $m$. Therefore, the number of cycles which must be added to the mode is $f_d = (m/t) = (2v/c) f_i$. The addition of $f_d$ cycles to the mode frequency is achieved by an increase of $f_d/2$ in the local oscillator frequency at one retrodirective terminal, because $f_d/2$ is added twice to the received carrier on its way to the transmitting antenna element. This result can also be achieved by reducing the local oscillator frequency in the other retrodirective terminal by the amount $f_d/2$. To accomplish the frequency stabilization, only one of the local oscillators must be voltage controllable, as the other local oscillator needs to be only approximately stable.

Unless there is inversion of the received frequency relative to the transmitted frequency, the electrical propagation path length for an instantaneous plane wavefront must be uniform for all array elements of a retrodirective antenna array of a retrodirective oscillating loop. Therefore, a plane array should have uniform transmission lines between each pair of receiving and transmitting antenna elements. The curvature of a curved transmitting array must be reversed with respect to the curvature of the receiving array, i.e., convex and concave, respectively. If phase inversion is applied and frequency is unchanged, any additional path length can be inserted before the inverter provided this delay is matched by an additional path length after the inverter. When the received and transmitted frequencies are inverted for the practice of this invention, curved arrays may be convex or concave in both the receiving portion and the transmitting portion. Therefore, in the practice of this invention, antenna array elements can be positioned on the outer side of any closed surface and rotated about an arbitrary axis without causing interference with the retrodirectivity if both the receiving and transmitting arrays have identical geometry and are rigidly connected.

If the frequency is also changed in the inverter, additional delays ahead of the inverter can be compensated with respect to their effect on the phase by incorporating delays behind the inverter by scaling the path lengths in proportion to the wavelengths. This scaling can be achieved by scaling the dimensions of the two antenna arrays of a retrodirective terminal in proportion to the wavelength to be received or transmitted. The design of a retrodirective antenna for a spin stabilized terminal for the practice of this invention is based on this principle.

The antenna array terminal of FIG. 1A comprises spherical surfaces 12A and 14A rigidly interconnected by tubular member 16A. Dipole antenna elements 20 and 22 are uniformly distributed over the surfaces of the spheres 12A and 14A, respectively. Antenna array dipoles 20 and 22 are illustrative of the several dipoles distributed uniformly over the surface of the respective spheres 12A and 14A. Dipoles 20 and 22 are disposed at an angle $\theta$ from the direction vectors $d_{ab}$ from the center of the spheres to the remote terminal B. Since the distance to the remote terminal B may effectively be considered infinite, the angle $\theta$ is the same at both spheres. Spherical antenna element arrays on spheres 12A and 14A are of different diameters and are scaled in proportion to the respective wavelength of the carrier frequency being received or transmitted. The crossed dipole radiating antenna elements, of which exemplary elements 20 and 22 are shown disposed on the surfaces of spheres 12A and 14A, are designed for circular polarization. Various other designs may be used for the antenna elements such as slots and horns. Tubular interconnecting member 16A conveniently houses the associated electrical circuitry presented in FIG. 2.

A respective reflecting sphere 24 and 26 is arranged inside and concentric with the dipole supporting sphere 12 and 14 for good match of the radiators to the radiation field. The radius of the reflecting sphere is a quarter wavelength smaller than the respective supporting sphere, and the radiating elements are distributed on the surface as uniformly as possible at a separation of about one-half wavelength from each other. The electrical length of the electronic connecting circuit between each pair of antenna elements 20 and 22 is selected to be equal.

The retrodirective antenna array terminal A conprising two spheres 12A and 14A illustrated in FIG. 1A is not completely omnidirectional. When operating in nearly an axial direction, the front sphere facing terminal B will interfere with the radiation of the rear sphere. In certain cases this interference can be reduced and practically eliminated when the separation of the spheres is increased. Complete omnidirectionality is not required in many applications. Illustratively, if the terminal A is to be used in space, it is advantageous to spin stabilize it about the axis of symmetry. If the other terminal B is located on the plane normal to the spin axis, one-dimensional directivity within this plane is all that is required. Consequently, fixed linear arrays may be desirably arranged on the cylindrical surface to provide limited retrodirectivity.

Figures 1B, 1C:
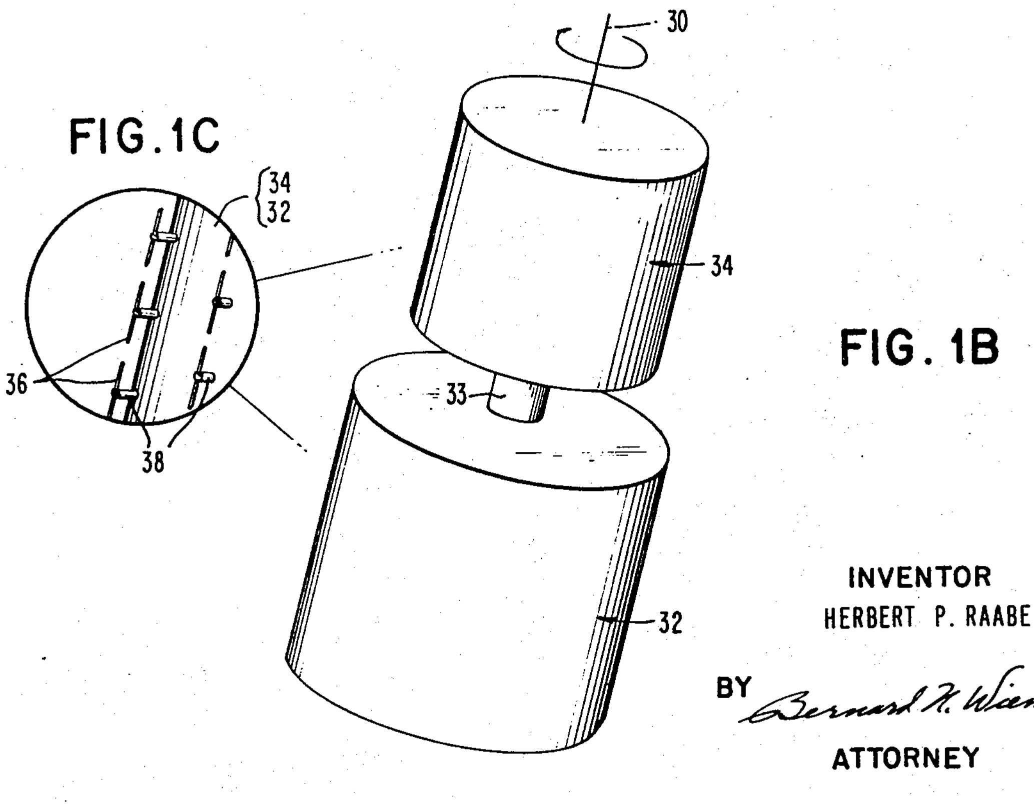
FIG. 1B is a perspective view showing another design of a retrodirective antenna array terminal for the practice of this invention which is spin stabilized and has matching cylindrical geometrical surfaces rigidly interconnected upon which reciprocal antenna array elements are respectively located.
FIG. 1C is a fragmentary perspective view of a particular design for the terminal of FIG. 1B.

The retrodirective antenna array terminal illustrated in FIG. 1B is disposed in accordance with the principles of this invention. It is spin stabilized around its spin axis 30. The spin stabilization is achieved by conventional gyroscopic stabilizing equipment housed within the terminal or mounted externally thereto, in a manner not shown. The terminal of FIG. 1B has a lower cylindrical surface 32 and an upper cylindrical surface 34. The antenna elements are of the nature of linear dipole arrays 36 shown in FIG. 1C.

Figures 2A, 2B:
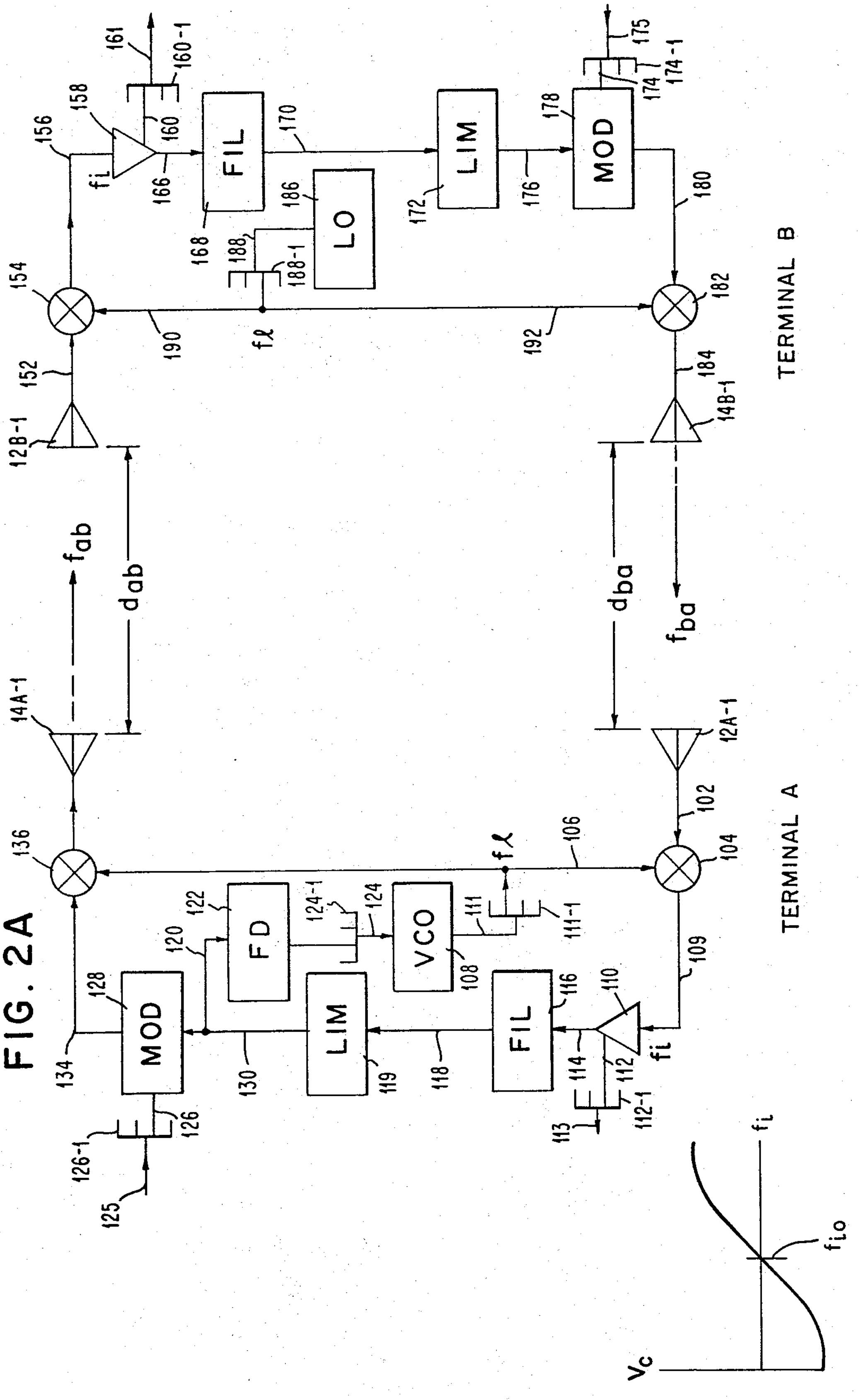
FIG. 2A is a schematic circuit diagram of electronic circuitry for retrodirective antenna array terminals of a retrodirective oscillating loop for the practice of this invention.
FIG. 2B is a graph of control voltage plotted against intermediate frequency useful for a description of the operation of the circuitry presented in FIG. 2A.

Electronic circuitry for the preferred embodiment of this invention is illustrated in FIG. 2. At terminal A, control voltage for the local oscillator 108 is derived from a frequency discriminator 122 which monitors the intermediate frequency $f_i$. The circuit includes narrow band intermediate frequency filters 116 and 168 (Terminal B) and hard limiters 119 and 172 (Terminal B). An envelope detector is incorporated in the intermediate frequency amplifier 110, and an amplitude modulator 128 follows the limiter 119. At the limiter output 134, there is generated an unmodulated frequency carrier of standard amplitude and having a frequency near the center of the pass band of the intermediate frequency amplifier 110. This voltage feeds into the frequency discriminator 122 which derives a *dc* voltage proportional to the intermediate frequency which controls the frequency of the voltage controlled oscillator 108 at linear response. For the control circuit at terminal A and $|f_{ab}| > |f_{ba}|$, a decrease of the mode frequency causes an increase of the local oscillator 108 frequency. If a comparable control circuit is incorporated at terminal B, the response should be reversed. The electronic circuitry for the retrodirective oscillating loop in accordance with the practice of this invention will now be described in greater detail with reference to FIGS. 2A and 2B which present electrical circuits suitable for each of two remote terminals of the retrodirective oscillating loop, e.g., for the terminal A of FIG. 1A and for the terminal B of FIG. 1B, respectively. FIG. 1C is an enlarged partial view of the external surfaces of cylinders 32 and 34 shown in FIG. 1B. The antenna elements 36 are uniformly distributed upon the cylindrical surfaces 32 and 34 and fastened thereto via connectors 38 containing the coaxial connection wire from dipoles 36 to electronic circuitry housed within the cylinders and the tubular connection 33. The input frequency $f_{ba}$ is received at receive antenna element 12A-1, and the output frequency $f_{ab}$ is transmitted at antenna element 14A-1. Antenna element 12A-1 is connected via line 102 to mixer 104 which provides intermediate frequency $f_i$. Local oscillator 108 frequency $f_l$ is communicated via line 106 from voltage controlled local oscillator 108 to mixer 104 which provides intermediate frequency $f_i$ on line 109 to amplifier 110 which presents an output on line 112 and via line 114 to filter 116 which is communicated to limiter 119 on line 118. The output of limiter 119 is communicated via lines 130 and 120 to frequency discriminator 122 which controls the voltage controlled local oscillator 108 on line 124. Information signals are introduced to the terminal A on line 126 to modulator 128 which is connected via line 130 to limiter 119 and via line 134 to mixer 136. The output of mixer 136 is presented to transmit antenna element 14A-1 as frequency $f_{ab}$. The relationship between the input and output carrier frequencies is $|f_{ab}| > |f_{ba}|$.

The remote terminal B of FIG. 2A comprises receive antenna 12B-1 and transmit antenna 14B-1 connected to the remaining electrical circuitry. Receive antenna 12B-1 is connected via line 152 to mixer 154 whose output intermediate frequency $f_i$ is connected on line 156 to amplifier unit 158. The output of amplifier 158 is connected to output line 160 and via line 166 to filter 168. Filter 168 is connected via line 170 to limiter 172. Limiter 172 is connected via line 176 to modulator 178 whose output is connected via line 180 to mixer 182. Modulator 178 has an input on line 174. The output of mixer 182 is communicated on line 184 as frequency $f_{ba}$ to antenna element 14B-1.

The various connector units shown in FIG. 2A, i.e., units 111-1, 112-1, 124-1, and 126-1 at terminal A and units 160-1, 174-1, and 188-1 shown at terminal B permit the several pairs of antenna elements at each terminal and their interconnecting circuitry to be cooperatively coupled with the other pairs of antenna elements of the respective antenna arrays. Illustratively, a modulation signal is applied to line 125 and therefrom via connector unit 126-1 to each modulator unit 128 for every pair of antenna elements 12A-1 and 14A-1 of terminal A. Further, there is common voltage controlled oscillator 108 for the entire terminal A which feeds its output frequency $f_l$ via connector 111-1 to each pair of mixer units 104 and 136.

The nature of the operation of the circuit portion of terminal A of FIG. 2A including the frequency discriminator 122 and voltage controlled oscilltor 108 will now be described in greater detail with reference to FIG. 2B. There is presented in FIG. 2B a graph of the control voltage developed by the frequency discriminator 122 and applied via line 124 to voltage controlled oscillator 108 plotted against the intermediate frequency sampled by the frequency discriminator 122 on line 120 which is connected to line 130 interconnecting the limiter 119 and the modulator 128. The graph of FIG. 2B shows a linear portion that starts out from zero value and has both a negative branch and a positive branch. With the correct intermediate frequency $f_i$, no control voltage is generated. However, if the intermediate frequency increases, the control voltage becomes positive; and if the intermediate frequency decreases, the control voltage becomes negative. The crossover point is at a reference frequency $f_{io}$. At the crossover point, no control voltage is applied to the voltage controlled oscillator 108; and the frequency $f_l$ produced thereby is just correct to maintain stable operation of the retrodirective oscillating loop including terminals A and B.

The operation of the retrodirective oscillating loop described above with reference to FIGS. 1A and 2A will now be described in greater detail. The carrier frequency $f_{ab}$ is transmitted from terminal A to terminal B. The radiofrequency carrier after being received at terminal B is mixed with a signal of frequency $f_l$ from the local oscillator 186 to form the intermediate frequency $f_i = f_{ab} - f_l$. The intermediate frequency carrier is then amplified in amplitude in amplifier 158 and passed through narrow-band filter 168, hard limiter 172, and amplitude modulator 178. Finally, the intermediate frequency carrier is mixed in mixer 182 with the local oscillator signal to form the carrier frequency $f_{ba} = f_l - f_i$. Thus, the received and transmitted frequencies differ by twice the intermediate frequency $f_i$.

The received carrier frequency $f_{ba}$ is mixed in mixer 104 at terminal A with the voltage controlled local oscillator 108 frequency of the same frequency $f_l$ as at terminal B to form the same intermediate frequency $f_i = f_l - f_{ba}$. Similar intermediate frequency components are present in the circuit as in terminal B other than the frequency discriminator 122 and the voltage controlled oscillator 108. Finally, the intermediate frequency carrier $f_i$ is mixed with the local oscillator 108 frequency $f_l$ to return to the transmitted carrier frequency $f_{ab} = f_l + f_i$. The intermediate frequency amplifiers 110 and 158, which have an envelope detector output, and the amplitude modulators 128 and 178 are required for transmitting message signals from one terminal to the other but do not play a significant role in the formation of the retrodirective oscillating mode. The filters 116 and 168 are of sufficiently narrow bandwidth that the intermediate frequency carrier stays in the center of the intermediate frequency band. They are also effective in suppressing the modulation sidebands. The limiters 119 and 172 control the loop gain so that maximum undisturbed power is transmitted, and it also erases any amplitude modulation which may have passed the respective filter 116 and 168. The frequency discriminator 122 connected to the voltage controlled local oscillator 108 at terminal A serves to stabilize the retrodirective oscillating loop mode frequency. Because of the action of the filters 116 and 168 and the limiters 119 and 172, the retrodirective oscillating loop sustains only a sinusoidal carrier frequency in the stationary case.

The frequency condition for the operation of the retrodirective oscillating loop of FIG. 2A can be derived by assuming a break at an arbitrary location of the loop. The signal fed around the loop should then appear at the break point with the same amplitude and phase as the transmitted signal. Thus, by assuming the break point between mixer 136 and antenna element 14A-1, there can be written:

$$A \cos (2\pi f_{ab}t + \phi_{ab}) = A \cos [2\pi f_{ab}t + \phi_{ab} - 2\pi f_{ab}(d_{ab}/c) - 2\pi f_{lb}t - \phi_{lb} - \phi_{ib} - 2\pi f_{ib}t - \phi_{ib} - 2\pi f_{ba}(d_{ba}/c) + 2\pi f_{la}t + \phi_{la} - \phi_{ia} + 2\pi f_{ia}t + \phi_{la}].$$

The general solution is:

$$\pm [f_{ab}t + (\phi_{ab}/2\pi)] = f_{ab}t + (\phi_{ab}/2\pi) - f_{ab}(d_{ab}/c) - f_{ba}(d_{ba}/c) - 2fl_bt - (2\phi_{lb}/2\pi) - (\phi_{ib}/2\pi) - (\phi_{ia}/2\pi) + 2f_{la}t + (2\phi_{la}/2\pi) + m. \quad (2)$$

where $m$ is the number of wave cycles stored in the loop. If the terminals A and B are stationary, this equation becomes stationary only for the positive sign; and if the two local oscillators are in synchronism ($f_{la} = f_{ab}$). Furthermore, by equalizing $\phi_{ia} = \phi_{ib} = \phi_i$, the solution for the stationary condition becomes $$f_{ab}(d_{ab}/c) + f_{ba}(d_{ba}/c) + [2(\phi_{lb} - \phi_{la})/2\pi] + (2\phi_i/2\pi) - m = 0. \quad (3)$$

It can be proven that all parts of radiating antenna elements contribute coherently to the retrodirective wave. In FIG. 1A each of the arbitrarily chosen radiating antenna elements 20 and 22 is located at an angular distance $\phi$ from the direction of the other terminal in the retrodirective oscillating loop from which radiation is received. If the distances measured from the centers of the transmitting and receiving spheres 14A and 12A are $D_{ab}$ and $D_{ba}$, respectively, the distances of the radiators become $$d_{ab} = D_{ab} - r_{ab} \cos \phi \quad (4a)$$

and $$d_{ba} = D_{ba} - r_{ba} \cos \phi. \quad (4b)$$

Since the phase equation ($e$) must be independent of $\phi$, $$f_{ab} (d_{ab} - r_{ab} \cos \phi/c) + f_{ba} (D_{ba} - r_{ba} \cos \phi/c) = \text{const.} \quad (5)$$

This leads to $$d_{ab}\, r_{ab} + f_{ba}\, r_{ba} = 0 \quad (6)$$

or $$(f_{ab}/f_{ba}) = -(r_{ba}/r_{ab}) \quad (7)$$

Since $$f_{ba} = f_{ab} - 2f_i \quad (8)$$

as can be derived for the circuit of terminal B, $f_{ba}$ is negative; and the radii $R_{ba}$ and $R_{ab}$ of the spheres 12A and 14A are desirably made proportional to the wavelength.

Rotation about the axis of symmetry does not affect the phase equation. Rotation about an arbitrary axis can be considered as a synchronous rotation of both spheres, which does not cause a phase variation, superimposed on an osicllatory displacement of the centers of the spheres due to their physical separation which affects the phase equation only by the longitudinal component.

The stabilization of the retrodirective oscillating loop against translational motions is described in the following section. It is assumed that the two terminal A and B change their distance apart at the constant speed $v$, then $$d_{ab} = d_{ab0} + vt, \quad (9a)$$

and $$d_{ba} = d_{ba0} + vt. \quad (9b)$$

With these expressions, the phase equation (3) indicates that the carrier frequencies $f_{ab}$ and $f_{ba}$ must change in such a way as to maintain a constant number of wave cycles along the propagation paths. However, if the carrier frequencies should remain stationary, a difference of the local oscillator frequencies could compensate for the change of wave cycles. To determine the relation between these magnitudes, there is derived from (2) and (9)

$$f_{ab} (d_{ab0} + vt/c) + f_{ba} (d_{ba0} + vt/c) + 2(f_{lb} - f_{la})t = \text{const.} \quad (10)$$

Hence, $$(v/c)(f_{ab} + f_{ba}) + 2(f_{lb} - f_{la}) = 0. \quad (11)$$

Since $$f_{ab} = f_i + f_l, \quad (12a)$$

and $$f_{la} = f_i - f_l, \quad (12b)$$

(11) becomes $$(v/c)\, f_i = f_{la} - f_{lb}. \quad (13)$$

The assumption that the local oscillator frequencies are equal in (12) causes only a second order error in (13) which is insignificant for this analysis. Thus, there is determined from (13) that the two local oscillators should be tuned apart by the one-way Doppler shift for the intermediate frequency in order to maintain constant frequencies $f_{ab}$ and $f_{ba}$ in the retrodirective oscillating loop.

SUMMARY

This invention provides a retrodirective oscillating loop which is stabilized against Doppler shifts, oscillator drift, and rotational motion of the terminals. The frequencies in and out at a terminal are shifted respectively from the positive to the negative spectrum by subtracting a larger value frequency from the incoming frequency. The rotational motion of the terminals is compensated by making the dimensions of each of the geometrically similar surface configurations of a terminal proportional to the wavelength being accommodated. The surface configurations are deviated, i.e., they differ from planar surfaces, e.g., the deviated surfaces may be spherical or cylindrical curved surfaces. Another suitable deviated surface configuration is a polyhedron.

Further, by tracking the frequency in the oscillation by a voltage controlled oscillator controlled by frequency discriminator in the intermediate frequency path, the differential Doppler shift resultant from the difference of in and out frequencies at the terminals is compensated. The differential frequency is introduced in order that there be isolation between the in and out terminals.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A system for transferring radiant wavefront energy comprising:

first and second antenna means spaced from each other and respectively adapted to receive radiant wavefront energy of one phase and to transmit phase inverted radiant wavefront energy, said first and second antenna means having respective geometrically similar deviated surface configurations relative to said wavefronts of said radiant energies; and means for electrically isolating said first and second antenna means from each other comprising a structural member rigidly interconnecting and maintaining in fixed spacial relationship said respective geometrically similar deviated surface configurations of said first and second antenna means.

2. A system for transferring radiant energy as set forth in claim 1 wherein said structural member is a hollow member.

3. A system as set forth in claim 2 wherein said hollow member contains electrical circuitry for electrically interconnecting said first and second antenna means with each other.

4. A system for transferring radiant wavefront energy comprising:

first and second remotely located retrodirective terminals defining a retrodirective oscillating loop having a carrier oscillation frequency for transferring radiant wavefront energy between said terminals;

voltage controllable oscillator means located at one of said terminals defining said carrier oscillation frequency; and means controlling said oscillator means for stabilizing said carrier oscillation frequency against both Doppler frequency shift due to relative motion of said terminals and frequency drift of said carrier oscillation frequency defining meanS.

5. A system for transferring radiant wavefront energy as set forth in claim 4 wherein there is included means for shifting a transmitted frequency of radiant energy into the negative spectrum relative to a received frequency of radiant energy.

6. A system for transferring radiant energy as set forth in claim 5 wherein the magnitude of the transmitted frequency is different than the magnitude of the received frequency.

7. A system as set forth in claim 5 wherein said received radiant energy frequency is partially defined by one of two side bands of a carrier oscillation and said transmitted frequency is partially defined by said other side band of said carrier oscillation.

8. A system as set forth in claim 4 which includes a frequency discriminator monitoring said local oscillator frequency to stabilize received and transmitted frequencies.

9. A system for transferring radiant wavefront energy comprising:

retrodirective antenna means each adapted to receive radiant wavefront energy of a first carrier oscillation frequency and to transmit phase inverted radiant wavefront energy of a second carrier oscillation frequency;

means for providing an electrical waveform frequency for determining said received and transmitted radiant wavefront energy frequencies; and means for stabilizing said received and transmitted frequencies against both Doppler frequency shift of said received and transmitted frequencies and drift of said means for providing an electrical waveform frequency.

10. A system for transferring radiant wavefront energy in accordance with claim 9 wherein said means for providing an electrical waveform frequency comprises a local oscillator.

11. A system for transferring radiant wavefront energy as set forth in claim 9 wherein there is included means for shifting said transmitted frequency of radiant energy into the negative spectrum relative to said received frequency of radiant energy.

12. A system for transferring radiant energy as set forth in claim 11 wherein the magnitude of the transmitted frequency is different than the magnitude of the received frequency.

13. A system for transferring radiant energy as set forth in claim 11 wherein said received radiant energy frequency is partially defined by one of two possible side bands of a carrier oscillation and said transmitted frequency is partially defined by said other side band of said carrier oscillation.

14. A system for transferring radiant energy as set forth in claim 10 which includes a frequency discriminator monitoring said local oscillator frequency to stabilize said received and transmitted frequencies.

15. A system for transferring radiant wavefront energy as set forth in claim 9 wherein said means for stabilizing said received and transmitted wavefront energies comprises:

a voltage controlled oscillator providing a first electrical waveform frequency;

means for mixing said first frequency with said received frequency to provide a second local electrical waveform frequency;

frequency discriminator means for monitoring said second local frequency to provide a voltage related thereto and being connected to said voltage controlled oscillator; and means for mixing said second frequency with said first frequency to provide said transmitted frequency.

16. In a retrodirective oscillating loop:

first and second remotely located retrodirective antenna terminals disposed within the field of view of each other for transferring radiant wavefront energy between said terminals;

first and second antenna meanS at one of said retrodirective antenna terminals having respective geometrically similar deviated surfaces for receiving and transmitting respectively said radiant wavefront energies;

means located at one of said terminals for providing an electrical waveform frequency for determining said received and transmitted radiant wavefront energy frequencies; and means for stabilizing said received and transmitted frequencies against both Doppler frequency shift of said received and transmitted frequencies and drift of said means for providing an electrical waveform frequency.

17. The combination of claim 16 wherein said second antenna means transmits radiant wavefront energy in automatic fixed correspondence with the radiant wavefront energy received by said first antenna means.

* * * * *